United States Patent
Zhang et al.

(10) Patent No.: US 11,509,146 B1
(45) Date of Patent: Nov. 22, 2022

(54) DUAL-BATTERY CHARGING APPARATUS AND CONTROL METHOD

(71) Applicant: NuVolta Technologies (Hefei) Co., Ltd., Hefei (CN)

(72) Inventors: Junhe Zhang, Shanghai (CN); Fuchun Zhan, Shanghai (CN); Miaosong Wu, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 0 days.

(21) Appl. No.: 17/858,342

(22) Filed: Jul. 6, 2022

(30) Foreign Application Priority Data

Apr. 19, 2022 (CN) .......................... 202210407486.5

(51) Int. Cl.
| | |
|---|---|
| *H02J 7/00* | (2006.01) |
| *H02M 3/07* | (2006.01) |
| *H02M 1/00* | (2006.01) |
| *H02M 1/08* | (2006.01) |
| H02M 3/158 | (2006.01) |
| H02J 1/10 | (2006.01) |
| H02J 3/46 | (2006.01) |
| H02J 3/38 | (2006.01) |

(52) U.S. Cl.
CPC ...... *H02J 7/0014* (2013.01); *H02J 7/007194* (2020.01); *H02M 1/0067* (2021.05); *H02M 1/08* (2013.01); *H02J 1/102* (2013.01); *H02J 3/38* (2013.01); *H02J 3/46* (2013.01); *H02J 2207/20* (2020.01); *H02M 3/07* (2013.01); *H02M 3/158* (2013.01)

(58) Field of Classification Search
CPC ............ H02J 7/0014; H02J 7/007194; H02M 1/0067; H02M 1/08
See application file for complete search history.

(56) References Cited

U.S. PATENT DOCUMENTS

| | | | | |
|---|---|---|---|---|
| 5,412,305 | A * | 5/1995 | Jeanneret | H02J 7/0018 320/162 |
| 5,532,524 | A * | 7/1996 | Townsley | G06F 1/26 307/64 |
| 6,459,175 | B1 * | 10/2002 | Potega | H02J 7/00047 307/132 M |
| 6,690,585 | B2 * | 2/2004 | Betts-LaCroix | H02M 3/1584 363/16 |
| 7,002,265 | B2 * | 2/2006 | Potega | B60L 53/11 702/66 |
| 7,692,330 | B2 * | 4/2010 | Takada | H02J 7/34 307/45 |

(Continued)

FOREIGN PATENT DOCUMENTS

| | | |
|---|---|---|
| CN | 112640284 A | 4/2021 |
| CN | 113725959 A | 11/2021 |

(Continued)

*Primary Examiner* — John T Trischler
(74) *Attorney, Agent, or Firm* — Slater Matsil, LLP (57) ABSTRACT

A battery charging apparatus includes a first converter having an input coupled to an input voltage bus and an output coupled to a first battery, and a second converter having an input coupled to the input voltage bus and an output coupled to the first battery and a second battery through a first bidirectional current blocking switch and a second bidirectional current blocking switch, respectively.

20 Claims, 4 Drawing Sheets

(56) References Cited

U.S. PATENT DOCUMENTS

| | | | | |
|---|---|---|---|---|
| 7,911,077 B2* | 3/2011 | Ichikawa | ............... | H02J 7/345 |
| | | | | 307/9.1 |
| 7,932,700 B2* | 4/2011 | Cintra | ................. | H01M 10/052 |
| | | | | 320/140 |
| 7,989,978 B2* | 8/2011 | Ichikawa | ............... | B60L 58/26 |
| | | | | 320/136 |
| 8,035,252 B2* | 10/2011 | Ichikawa | ............ | H01M 10/637 |
| | | | | 307/46 |
| 8,039,987 B2* | 10/2011 | Sawada | ................. | B60K 6/365 |
| | | | | 307/9.1 |
| 8,115,454 B2* | 2/2012 | Cintra | ................. | H01M 10/44 |
| | | | | 320/140 |
| 8,368,346 B2* | 2/2013 | Batson | ................. | H02J 7/0071 |
| | | | | 320/137 |
| 8,441,228 B2* | 5/2013 | Brabec | ................. | H02J 7/342 |
| | | | | 180/65.21 |
| 8,466,655 B2* | 6/2013 | Mitsutani | ............. | B60L 50/16 |
| | | | | 320/109 |
| 8,541,905 B2* | 9/2013 | Brabec | ................... | B60L 53/00 |
| | | | | 320/116 |
| 8,598,734 B2* | 12/2013 | Kusumi | .............. | H02M 3/1584 |
| | | | | 903/902 |
| 8,633,677 B2* | 1/2014 | Kim | .................... | H01M 10/441 |
| | | | | 320/140 |
| 8,659,182 B2* | 2/2014 | Ichikawa | ................ | B60L 58/21 |
| | | | | 307/9.1 |
| 9,102,241 B2* | 8/2015 | Brabec | .................... | B60L 58/22 |
| 9,199,543 B2* | 12/2015 | Brabec | .................... | H02J 7/342 |
| 9,219,369 B2* | 12/2015 | Mehta | ................... | H02J 7/0042 |
| 9,236,760 B2* | 1/2016 | Iyasu | ...................... | H02J 7/04 |
| 9,266,439 B2* | 2/2016 | Wanke | .................. | B60L 1/006 |
| 9,548,620 B2* | 1/2017 | Hu | ...................... | C02F 1/4691 |
| 9,590,436 B2* | 3/2017 | Sporck | ................. | H02J 7/00 |
| 9,694,697 B2* | 7/2017 | Brabec | ................ | H02M 3/1582 |
| 9,821,668 B2* | 11/2017 | Kusch | ................ | B60L 15/007 |
| 9,973,017 B2* | 5/2018 | Kudo | ..................... | H02J 7/00 |
| 10,044,182 B2* | 8/2018 | Takahashi | ............ | H02J 7/0013 |
| 10,097,017 B2* | 10/2018 | Greening | ............. | H02M 3/158 |
| 10,326,296 B2* | 6/2019 | Pullen | ....................... | G06F 1/26 |
| 10,333,398 B2* | 6/2019 | Takahashi | ............ | H02M 3/155 |
| 10,523,032 B2* | 12/2019 | Huang | ................... | B60L 50/10 |
| 10,541,541 B2* | 1/2020 | Zhang | .............. | H02M 3/33573 |
| 10,673,260 B2* | 6/2020 | Greening | .................. | H02M 1/10 |
| 10,700,527 B2* | 6/2020 | Kobayashi | ................ | H02J 7/34 |
| 10,707,690 B2* | 7/2020 | Jung | ........................ | H02J 7/00 |
| 10,826,395 B2* | 11/2020 | Song | ...................... | H02M 3/07 |
| 10,862,316 B2* | 12/2020 | Baby | ..................... | H02J 7/0014 |
| 10,897,134 B2* | 1/2021 | Kobayashi | ............ | H02J 7/0024 |
| 11,043,831 B2* | 6/2021 | Kominami | ............ | H02M 3/155 |
| 11,070,073 B2* | 7/2021 | Tiedtke | ................. | H02J 7/0068 |
| 11,088,549 B2* | 8/2021 | Lim | ....................... | H02J 7/0045 |
| 11,088,550 B2* | 8/2021 | Jaensch | ..................... | H02J 7/02 |
| 11,101,674 B2* | 8/2021 | Walley | .............. | H02M 3/33573 |
| 11,101,742 B2* | 8/2021 | Vavilpalli | .............. | H02J 3/381 |
| 11,155,175 B2* | 10/2021 | Ishida | ....................... | B60L 53/60 |
| 11,190,038 B2* | 11/2021 | Jang | ...................... | H02J 7/0045 |
| 11,196,283 B2* | 12/2021 | Gerrits | .................... | B60L 53/51 |
| 11,205,955 B1* | 12/2021 | D'Amore | .............. | H02M 3/04 |
| 11,211,643 B2* | 12/2021 | Maeda | ................... | H01M 10/482 |
| 11,228,190 B2* | 1/2022 | Tiedtke | ................. | B60R 16/033 |
| 11,251,637 B2* | 2/2022 | Tiedtke | .................. | B60L 58/12 |
| 11,290,007 B2* | 3/2022 | Koerner | ................. | H02J 7/02 |
| 11,342,774 B2* | 5/2022 | Song | ................... | H02J 7/00714 |
| 11,404,895 B2* | 8/2022 | Song | ........................ | H02J 7/00 |
| 11,424,629 B1* | 8/2022 | Han | ...................... | H02J 7/0014 |
| 11,440,423 * | 9/2022 | Jimenez Pino | ........ | B60L 53/22 |
| 2003/0043597 A1* | 3/2003 | Betts-LaCroix | ........ | H02J 1/102 |
| | | | | 363/16 |
| 2003/0085621 A1* | 5/2003 | Potega | ................... | H02J 7/00047 |
| | | | | 307/18 |
| 2006/0261779 A1* | 11/2006 | Maleus | ............... | H02J 7/0018 |
| | | | | 320/128 |
| 2007/0009770 A1* | 1/2007 | Takada | ..................... | H02J 7/34 |
| | | | | 320/101 |
| 2008/0238369 A1* | 10/2008 | Cintra | ................. | H01M 10/052 |
| | | | | 320/155 |
| 2009/0103341 A1* | 4/2009 | Lee | ......................... | B60L 53/14 |
| | | | | 320/140 |
| 2009/0195067 A1* | 8/2009 | Ichikawa | .......... | H02J 7/007192 |
| | | | | 307/9.1 |
| 2009/0289497 A1* | 11/2009 | Ichikawa | ................ | B60L 58/20 |
| | | | | 307/82 |
| 2009/0315403 A1* | 12/2009 | Ichikawa | ................ | B60L 50/16 |
| | | | | 320/134 |
| 2010/0001583 A1* | 1/2010 | Ichikawa | ................ | B60L 50/16 |
| | | | | 320/136 |
| 2010/0060080 A1* | 3/2010 | Sawada | ................ | B60W 20/00 |
| | | | | 307/48 |
| 2010/0097031 A1* | 4/2010 | King | ........................ | B60L 53/24 |
| | | | | 320/109 |
| 2010/0127669 A1* | 5/2010 | Iida | ....................... | H02J 7/0019 |
| | | | | 320/137 |
| 2010/0141213 A1* | 6/2010 | Iida | .................... | H01M 10/482 |
| | | | | 320/134 |
| 2010/0181829 A1* | 7/2010 | Ichikawa | ............ | H01M 10/425 |
| | | | | 307/9.1 |
| 2010/0194344 A1* | 8/2010 | Greyling | ............... | H02M 3/157 |
| | | | | 320/128 |
| 2011/0025124 A1* | 2/2011 | Brabec | .................. | H02J 7/1423 |
| | | | | 307/9.1 |
| 2011/0025125 A1* | 2/2011 | Brabec | .................... | B60L 53/54 |
| | | | | 307/9.1 |
| 2011/0025126 A1* | 2/2011 | Brabec | .................... | B60L 58/15 |
| | | | | 307/9.1 |
| 2011/0080143 A1* | 4/2011 | Parakulam | .......... | H02M 3/1584 |
| | | | | 323/318 |
| 2011/0156655 A1* | 6/2011 | Kim | .................... | H01M 10/441 |
| | | | | 320/134 |
| 2011/0285350 A1* | 11/2011 | Mitsutani | ................ | B60L 50/61 |
| | | | | 320/109 |
| 2012/0032505 A1* | 2/2012 | Kusumi | ................ | B60L 58/18 |
| | | | | 307/10.1 |
| 2012/0038324 A1* | 2/2012 | Humphrey | .............. | B60L 53/62 |
| | | | | 320/138 |
| 2012/0112688 A1* | 5/2012 | Ho | ........................ | H02J 7/0047 |
| | | | | 320/157 |
| 2012/0139501 A1* | 6/2012 | Cintra | ................ | H01M 10/058 |
| | | | | 320/137 |
| 2012/0181983 A1* | 7/2012 | Khan | ..................... | B60L 53/14 |
| | | | | 320/109 |
| 2012/0261982 A1* | 10/2012 | Wanke | .................... | B60L 1/006 |
| | | | | 307/9.1 |
| 2013/0093394 A1* | 4/2013 | Iyasu | ....................... | H02J 7/04 |
| | | | | 320/109 |
| 2013/0221897 A1* | 8/2013 | Brabec | ................. | H02J 7/0013 |
| | | | | 320/104 |
| 2013/0241466 A1* | 9/2013 | Mitsuda | ............... | H01M 10/441 |
| | | | | 320/103 |
| 2013/0249466 A1* | 9/2013 | Hsieh | ..................... | H02J 7/0013 |
| | | | | 320/101 |
| 2013/0270116 A1* | 10/2013 | Hu | ....................... | C02F 1/4604 |
| | | | | 204/661 |
| 2013/0334878 A1* | 12/2013 | Brabec | ............... | H02M 3/1582 |
| | | | | 307/9.1 |
| 2014/0009106 A1* | 1/2014 | Andrea | .................. | H02H 9/002 |
| | | | | 320/126 |
| 2014/0203654 A1* | 7/2014 | Takahashi | ......... | H01M 10/4207 |
| | | | | 307/43 |
| 2014/0266011 A1* | 9/2014 | Mehta | ................... | H02M 3/1584 |
| | | | | 320/107 |
| 2014/0347003 A1* | 11/2014 | Sporck | .................... | H02J 1/102 |
| | | | | 320/107 |
| 2014/0347013 A1* | 11/2014 | Kim | .................... | H02J 7/0016 |
| | | | | 320/134 |
| 2015/0162831 A1* | 6/2015 | Ladret | .................... | H01L 27/06 |
| | | | | 307/23 |
| 2015/0188350 A1* | 7/2015 | Deboy | ..................... | H02M 3/04 |
| | | | | 320/128 |

(56) References Cited

U.S. PATENT DOCUMENTS

| | | | | |
|---|---|---|---|---|
| 2016/0043585 A1* | 2/2016 | Zawadzki | | H02J 7/0068 |
| | | | | 320/137 |
| 2016/0087462 A1* | 3/2016 | Kudo | | H02J 7/00 |
| | | | | 320/162 |
| 2016/0380455 A1* | 12/2016 | Greening | | H02J 1/102 |
| | | | | 320/114 |
| 2017/0201113 A1* | 7/2017 | Gazit | | H02J 7/0013 |
| 2017/0279284 A1* | 9/2017 | Lim | | H02J 7/0024 |
| 2018/0034308 A1* | 2/2018 | Burkhart | | H02J 7/007 |
| 2018/0041060 A1* | 2/2018 | Walley | | H02J 7/00 |
| 2018/0102663 A1* | 4/2018 | Jung | | H02J 7/007 |
| 2018/0205253 A1* | 7/2018 | Kwak | | H02J 7/00034 |
| 2018/0241306 A1* | 8/2018 | Takahashi | | H02M 1/36 |
| 2018/0248385 A1* | 8/2018 | Zhang | | H02M 3/01 |
| 2018/0269697 A1* | 9/2018 | Zhang | | H02J 7/0024 |
| 2018/0375362 A1* | 12/2018 | Huang | | H02J 50/10 |
| 2019/0013683 A1* | 1/2019 | Greening | | H02J 1/102 |
| 2019/0036332 A1* | 1/2019 | Kobayashi | | H02J 1/102 |
| 2019/0052090 A1* | 2/2019 | Kobayashi | | H02J 7/34 |
| 2019/0081487 A1* | 3/2019 | Baby | | H02J 7/007 |
| 2019/0288526 A1* | 9/2019 | Jaensch | | H02P 27/08 |
| 2019/0329663 A1* | 10/2019 | Kominami | | H02M 1/088 |
| 2019/0344677 A1* | 11/2019 | Ishida | | B60L 53/16 |
| 2019/0372462 A1* | 12/2019 | Song | | H02M 1/0095 |
| 2020/0006952 A1* | 1/2020 | Jang | | H02J 1/102 |
| 2020/0044458 A1* | 2/2020 | Yoon | | H02J 7/00794 |
| 2020/0076225 A1* | 3/2020 | Naylor | | H02J 7/342 |
| 2020/0112177 A1* | 4/2020 | Song | | H02J 7/00034 |
| 2020/0127484 A1* | 4/2020 | Song | | H02M 1/0032 |
| 2020/0171971 A1* | 6/2020 | Tiedtke | | B60L 58/24 |
| 2020/0177007 A1* | 6/2020 | Tiedtke | | H02J 7/005 |
| 2020/0177008 A1* | 6/2020 | Tiedtke | | B60L 1/00 |
| 2020/0185947 A1* | 6/2020 | Tkachenko | | H02J 7/0071 |
| 2020/0244170 A1* | 7/2020 | Chen | | H02M 3/1582 |
| 2020/0321797 A1* | 10/2020 | Gerrits | | B60L 53/11 |
| 2021/0135478 A1* | 5/2021 | Schline | | G06F 1/3212 |
| 2021/0146792 A1* | 5/2021 | Lehn | | B60L 58/20 |
| 2021/0155100 A1* | 5/2021 | Khaligh | | B60L 55/00 |
| 2021/0159784 A1* | 5/2021 | Koerner | | H02M 1/10 |
| 2021/0167611 A1* | 6/2021 | Baby | | G06F 1/1635 |
| 2021/0203179 A1* | 7/2021 | Gambetta | | H02M 3/1582 |
| 2021/0211066 A1* | 7/2021 | Vavilpalli | | H02J 3/48 |
| 2021/0328514 A1* | 10/2021 | Schleicher | | H02J 7/0013 |
| 2021/0367278 A1* | 11/2021 | Zhang | | H01M 10/482 |
| 2021/0399630 A1* | 12/2021 | D'Amore | | H03F 3/181 |
| 2022/0006381 A1* | 1/2022 | Zhang | | H02M 3/1582 |
| 2022/0021302 A1* | 1/2022 | Khlat | | H03F 3/211 |
| 2022/0032797 A1* | 2/2022 | Jimenez Pino | | H02J 1/02 |
| 2022/0085642 A1* | 3/2022 | Wu | | H02M 1/007 |
| 2022/0109317 A1* | 4/2022 | Tiedtke | | B60L 1/00 |
| 2022/0109367 A1* | 4/2022 | D'Amore | | H02J 7/0068 |
| 2022/0140621 A1* | 5/2022 | Kwon | | H02J 7/00714 |
| | | | | 320/117 |
| 2022/0149644 A1* | 5/2022 | Liu | | H02J 7/345 |
| 2022/0263324 A1* | 8/2022 | Sun | | H02J 7/0063 |
| 2022/0263335 A1* | 8/2022 | Kouketsu | | H02J 7/00 |
| 2022/0294248 A1* | 9/2022 | Xu | | H02J 7/007182 |

FOREIGN PATENT DOCUMENTS

| | | |
|---|---|---|
| CN | 114244105 A | 3/2022 |
| WO | 2020169037 A1 | 8/2020 |

\* cited by examiner

DUAL-BATTERY CHARGING APPARATUS AND CONTROL METHOD

PRIORITY CLAIM

This disclosure claims the benefit of and priority to Chinese Patent Application No. 202210407486.5, filed on Apr. 19, 2022, which is hereby incorporated by reference in its entirety.

TECHNICAL FIELD

The present invention relates to a dual-battery charging apparatus and control method, and, in particular embodiments, to a dual-battery charging apparatus for efficiently charging a dual-battery system comprising a first battery and a second battery connected in parallel.

BACKGROUND

As technologies further advance, a variety of electronic devices, such as mobile phones, tablet PCs, digital cameras, MP3 players and/or the like, have become popular. Each portable device may employ a plurality of rechargeable battery cells. The plurality of rechargeable battery cells may be connected in series or in parallel so as to form a rechargeable battery pack for storing electrical energy.

Battery chargers are employed to restore energy to the batteries. A battery charger is controlled to provide voltage (e.g., a constant voltage charging mode) and current (e.g., a constant current charging mode) to a dual-battery system comprising a first battery and a second battery connected in parallel so as to restore energy to the dual-battery system.

There may be a variety of power conversion topologies suitable for charging batteries. In accordance with the topology difference, the power conversion topologies can be divided into three categories, namely, switching power converters, linear regulators and switched capacitor power converters. In comparison with other topologies, the switched capacitor converters are less complicated because the switched capacitor converters are formed by a plurality of switches and a flying capacitor. As a result, the switched capacitor converters can provide compact and efficient power for charging batteries.

In order to improve the battery charging performance, a dual-battery charging apparatus may comprise two power stages connected in parallel between an input voltage bus and the dual-battery system. A first power stage is a charge pump. A second power stage is a switching charger. The charge pump may be implemented as a suitable switched capacitor charger such as a dual-phase switched capacitor converter. A first phase of the dual-phase switched capacitor converter includes four switches connected in series between the input voltage bus and ground. A first flying capacitor is connected between a common node of two upper switches, and a common node of two lower switches. A common node of the second and third switches is connected to an output voltage bus coupled to the battery. A second phase of the dual-phase switched capacitor converter includes four switches connected in series between the input voltage bus and ground. A second flying capacitor is connected between a common node of two upper switches, and a common node of two lower switches. A common node of the second and third switches is connected to the output voltage bus.

The switching charger may be implemented as a suitable step-down power converter such as a buck converter. The switching charger includes two switches connected in series between the input voltage bus and ground. An inductor is connected between a common node of these two switches, and an output voltage bus. The output voltage bus is coupled to the dual-battery system through as an isolation switch providing isolation between the battery and the output voltage bus. The isolation switch includes two diodes. A first diode is between a bulk terminal and a source of the isolation switch. A second diode is between the bulk terminal and a drain of the isolation switch. These two diodes are back-to-back connected. As a result of having the back-to-back connected diodes, the isolation switch is able to fully isolate the dual-battery system from the output voltage bus.

In operation, the first battery and the second battery are connected in parallel. A voltage of one battery may be higher than that of the other battery. Such an unbalanced voltage may cause an unbalanced current distribution, which leads to an inrush current flowing through these two batteries. It would be desirable to have a simple and effective way to achieve a balanced charging current distribution between these two batteries.

SUMMARY

These and other problems are generally solved or circumvented, and technical advantages are generally achieved, by preferred embodiments of the present disclosure which provide a dual-battery charging apparatus and control method.

In accordance with an embodiment, a battery charging apparatus comprises a first converter having an input coupled to an input voltage bus and an output coupled to a first battery, and a second converter having an input coupled to the input voltage bus and an output coupled to the first battery and a second battery through a first bidirectional current blocking switch and a second bidirectional current blocking switch, respectively.

In accordance with another embodiment, a method comprises in a pre-charge state of a battery system comprising a first battery and a second battery in parallel, configuring a step-down converter to charge the first battery and the second battery through a first battery switch and a second battery switch, respectively, in a constant current charging state of the battery system, configuring a charge pump converter to charge the first battery directly, wherein in the constant current charging state, at least one of the first battery switch and the second battery switch is configured to achieve charge balancing between the first battery and the second battery, and in a constant voltage charging state of the battery system, configuring the step-down converter to charge the first battery and the second battery, wherein at least one of the first battery switch and the second battery switch is configured to operate in a regulation state so as to achieve constant voltage charging of the first battery and the second battery.

In accordance with yet another embodiment, a controller comprises a plurality of gate drivers configured to generate a plurality of gate drive signals for driving switches of a charge pump converter, switches of a step-down converter, a first battery switch and a second battery switch, wherein the charge pump converter has an input coupled to an input voltage bus and an output coupled to a first battery, and the step-down converter has an input coupled to the input voltage bus and an output coupled to the first battery and a second battery through the first battery switch and the second battery switch, respectively.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a dual-battery charging apparatus and control method. The disclosure may also be applied, however, to a variety of power systems. Hereinafter, various embodiments will be explained in detail with reference to the accompanying drawings.

Figure 1:
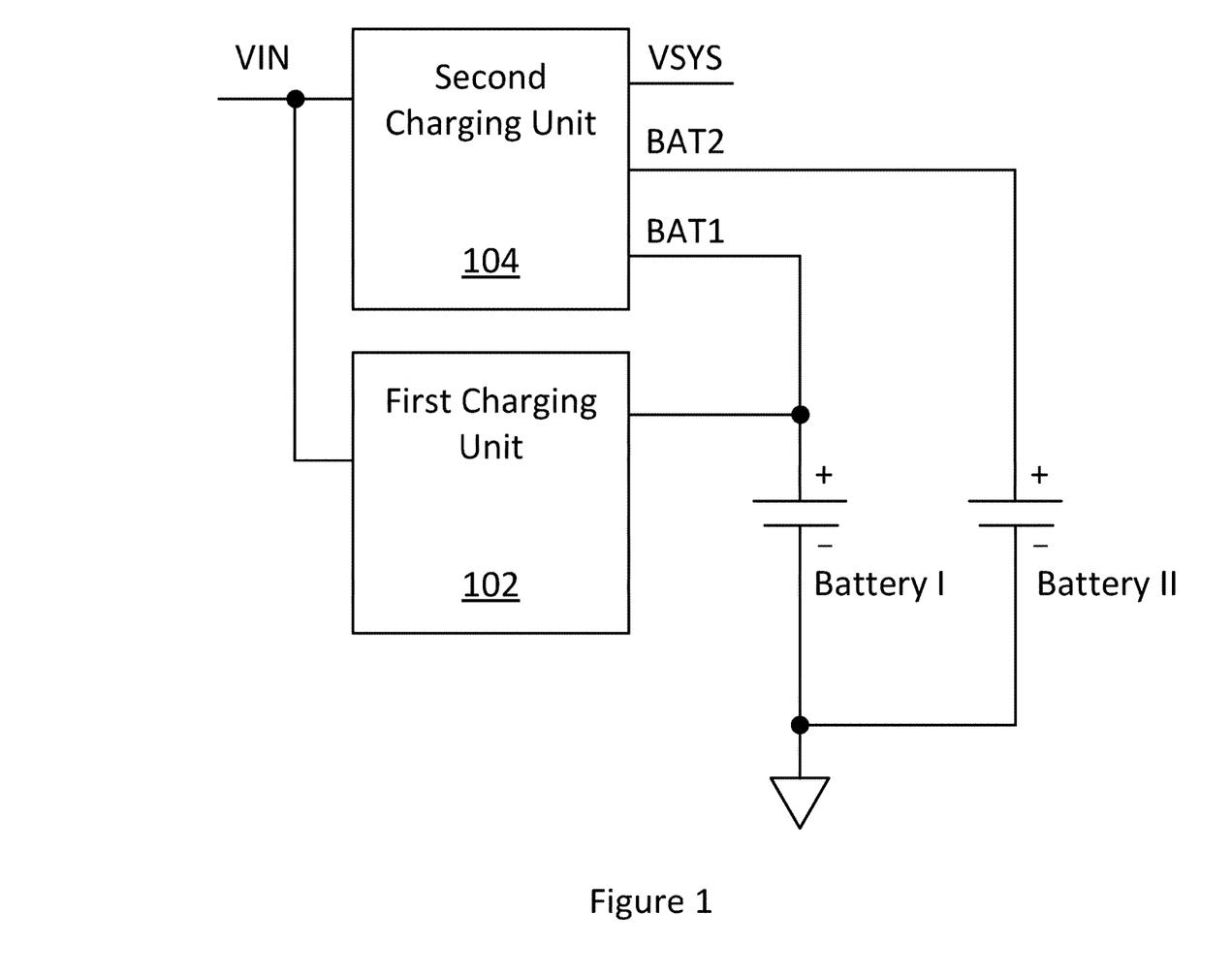
FIG. 1 illustrates a block diagram of a dual-battery charging apparatus in accordance with various embodiments of the present disclosure.

FIG. 1 illustrates a block diagram of a dual-battery charging apparatus in accordance with various embodiments of the present disclosure. The dual-battery charging apparatus comprises a first charging unit 102 and a second charging unit 104. The first charging unit 102 has an input coupled to an input voltage bus VIN and an output coupled to a first battery (Battery I). The second charging unit 104 has an input and three outputs. The input of the second charging unit 104 is coupled to the input voltage bus VIN. A first output (BAT1) of the second charging unit 104 is coupled to the first battery. A second output (BAT2) of the second charging unit 104 is coupled to a second battery (Battery II). A third output of the second charging unit 104 is coupled to a system voltage bus (VSYS). In some embodiments, VSYS may be used to provide power for other system components directly. In alternative embodiments, VSYS may be used to provide power for other system components through additional power systems such as a voltage regulator.

In some embodiments, the first charging unit 102 comprises a charge pump. More particularly, the charge pump may be a dual-phase switched capacitor converter configured to provide power to charge the first battery and the second battery in some charging states (e.g., a constant current charging state). Throughout the description, the charge pump may be alternatively referred to as a dual-phase charge pump converter, a dual-phase switched capacitor converter or a first converter. The structure and operating principle of the dual-phase switched capacitor converter will be described below with respect to FIG. 2.

In some embodiments, the second charging unit 104 comprises a step-down converter, a battery reverse blocking switch, a first battery switch and a second battery switch. In some embodiments, the step-down converter may be a buck converter configured to provide power to charge the first battery and the second battery in some charging states (e.g., a constant voltage charging state). Throughout the description, the step-down converter may be alternatively referred to as a buck converter or a second converter. The structure and operating principle of the buck converter will be described below with respect to FIG. 2.

The first battery switch is connected between the output of the buck converter and the first battery. The second battery switch is connected between the output of the buck converter and the second battery. Both the first battery switch and the second battery switch function as isolation switches. The first battery switch is able to provide reverse blocking capability to isolate the first battery from various system elements coupled to VSYS. In particular, the first battery switch is employed to connect the first battery to the buck converter or disconnect the first battery from the buck converter. Furthermore, the first battery switch may be configured to operate in a regulation state to control the voltage across the first battery and/or the current flowing through to the first battery. Throughout the description, the first battery switch may be alternatively referred to as a first bidirectional current blocking switch.

The second battery switch is able to provide reverse blocking capability to isolate the second battery from various system elements coupled to VSYS. In particular, the second battery switch is employed to connect the second battery to the buck converter or disconnect the second battery from the buck converter. Furthermore, the second battery switch may be configured to operate in a regulation state to control the voltage across the second battery and/or the current flowing through to the second battery. Throughout the description, the second battery switch may be alternatively referred to as a second bidirectional current blocking switch.

The battery reverse blocking switch is connected between the input voltage bus and the input of the buck converter. The battery reverse blocking switch is employed to connect the buck converter to an input power source coupled to VIN or disconnect the buck converter from the input power source.

In some embodiments, switches of the buck converter, the battery reverse blocking switch, the first battery switch and the second battery switch are integrated in a first semiconductor chip. Switches of the charge pump are integrated in a second semiconductor chip. In alternative embodiments, switches of the charge pump, switches of the buck converter, the battery reverse blocking switch, the first battery switch and the second battery switch into one single semiconductor chip.

The dual-battery charging apparatus further comprises a controller (not shown but illustrated in FIG. 3) configured to generate gate drive signals for the switches of the charge pump, the switches of the buck converter, the battery reverse blocking switch, the first battery switch and the second battery switch. Furthermore, the controller is configured to control the operation of each switch based on a plurality of operating parameters. In particular, the controller is configured to generate gate drive signals for configuring the first battery switch and the second battery switch during a charging process of the dual-battery system such that a balanced charging current distribution between the first battery and the second battery is achieved. The detailed operation principle of the controller will be described below with respect to FIGS. 3-4.

One advantageous feature of having the battery charging apparatus shown in FIG. 1 is that the dual-battery charging apparatus is able to use a simple and effective way to achieve a balanced charging current distribution between the first battery and the second battery without using the extra trace resistance compensation technique. By eliminating the extra trace resistance, the efficiency of the dual-battery charging apparatus can be significantly improved and the charging speed is increased. Furthermore, after the balanced charging current distribution between the first battery and the second battery has been achieved, the inrush current can be significantly reduced.

Figure 2:
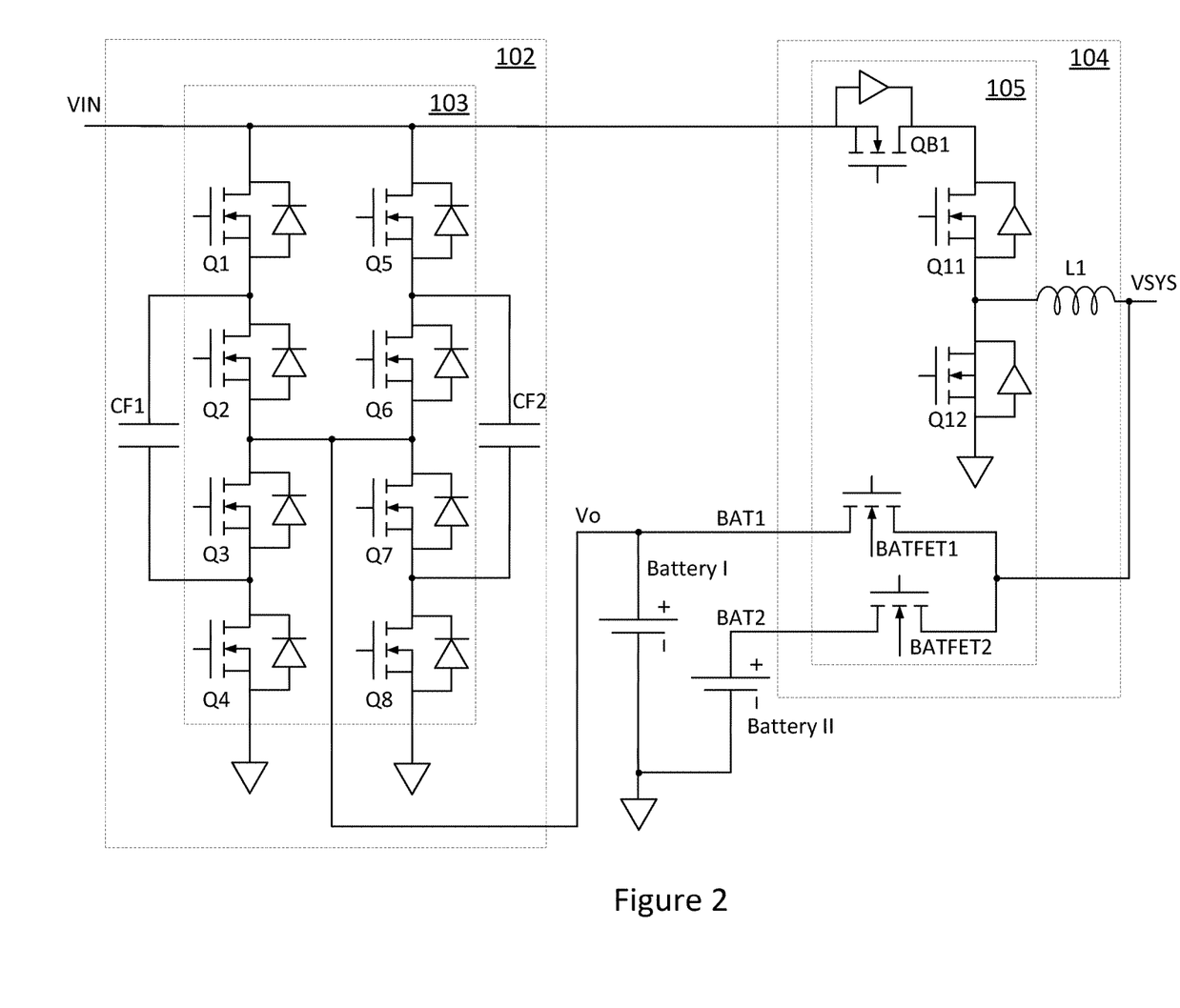
FIG. 2 illustrates a schematic diagram of the dual-battery charging apparatus shown in FIG. 1 in accordance with various embodiments of the present disclosure.

FIG. 2 illustrates a schematic diagram of the dual-battery charging apparatus shown in FIG. 1 in accordance with various embodiments of the present disclosure. The dual-battery charging apparatus includes a dual-phase switched capacitor converter, a buck converter, a battery reverse blocking switch QB1, a first battery switch BATFET1 and a second battery switch BATFET2. As shown in FIG. 2, the input of the dual-phase switched capacitor converter is connected to the input voltage bus VIN. The input of the buck converter is connected to the input voltage bus VIN through the battery reverse blocking switch QB1. The output of the dual-phase switched capacitor converter is connected to the first battery (Battery I). The output of the buck converter is connected to the system voltage bus VSYS. The output of the buck converter is connected to the first battery through the first battery switch BATFET1. The output of the buck converter is connected to the second battery (Battery II) through the second battery switch BATFET2.

In some embodiments, the first battery may be implemented as a single-cell battery. Alternatively, the first battery may be implemented as a multi-cell battery. Likewise, the second battery may be implemented as a single-cell battery. Alternatively, the second battery may be implemented as a multi-cell battery. In some embodiments, the battery capacity of the first battery is greater than the battery capacity of the second battery.

The dual-phase switched capacitor converter comprises two legs. A first leg comprises a first switch Q1, a second switch Q2, a third switch Q3 and a fourth switch Q4 connected in series between the input voltage bus VIN and ground. A first flying capacitor CF1 is connected between a common node of Q1 and Q2, and a common node of Q3 and Q4. A second leg comprises a fifth switch Q5, a sixth switch Q6, a seventh switch Q7 and an eighth switch Q8 connected in series between the input voltage bus VIN and ground. A second flying capacitor CF2 is connected between a common node of Q5 and Q6, and a common node of Q7 and Q8. As shown in FIG. 2, a common node of Q2 and Q3 is connected to the output voltage bus Vo. A common node of Q6 and Q7 is also connected to the output voltage bus Vo.

In operation, the dual-phase switched capacitor converter may be configured to operate in either a 2:1 fixed PWM mode or a 1:2 fixed PWM mode. More particularly, when a power source is connected to the input voltage bus VIN, the dual-phase switched capacitor converter converts the voltage on VIN into a lower voltage. In particular, the output voltage (voltage on Vo) is equal to one half of the input voltage (VIN/2). Under this configuration, the dual-phase switched capacitor converter operates in the 2:1 fixed PWM mode. On the other hand, when the battery functions as a power source, the dual-phase switched capacitor converter converts the voltage on Vo into a higher voltage. In particular, the output voltage (voltage on VIN) is twice the input voltage (voltage on Vo). Under this configuration, the dual-phase switched capacitor converter operates in the 1:2 fixed PWM mode. In the present disclosure, when a power source (e.g., a receiver coil of a wireless power transfer system) is connected to VIN, the dual-phase switched capacitor converter is configured to operate in the 2:1 fixed PWM mode to provide power for the first battery and the second battery.

In operation, the operating principle of the first leg is similar to that of the second leg except that the drive signals of the first leg (e.g., Q1) and the drive signals of the second leg (e.g., Q5) are 180 degrees out of phase from each other. For simplicity, only the operating principle of the first leg is described below in detail.

In operation, the first leg of the dual-phase switched capacitor converter is configured to operate in two different phases. During the first phase, switches Q1 and Q3 are turned on, and switches Q2 and Q4 are turned off. Since switches Q1 and Q3 are turned on, a first conductive path is established between VIN and Vo. The first conductive path is formed by switch Q1, the first flying capacitor CF1 and switch Q3. The current flows from VIN to Vo through the first conductive path. During the first phase, the first flying capacitor CF1 is charged and energy is stored in the first flying capacitor CF1 accordingly.

During the second phase, switches Q1 and Q3 are turned off, and switches Q2 and Q4 are turned on. Since switches Q2 and Q4 are turned on, a second conductive path is established. The second conductive path is formed by switch Q4, the first flying capacitor CF1 and switch Q2. During the second phase, the current discharges the first flying capacitor CF1 and the energy stored in the first flying capacitor CF1 decreases accordingly.

The buck converter comprises a high-side switch Q11 and a low-side switch Q12 connected in series between the input voltage bus VIN and ground. The buck converter further comprises an inductor L1 connected between a common node of the high-side switch Q11 and the low-side switch Q12, and an output bus of the buck converter.

It should be noted that the diagram shown in FIG. 2 is merely an example, which should not unduly limit the scope of the claims. One of ordinary skill in the art would recognize many variations, alternatives, and modifications. For example, the first converter may be implemented as a multiple-phase charge pump converter. The second converter may be implemented as any suitable power regulators such as a linear regulator.

In accordance with an embodiment, the switches of FIG. 2 (e.g., switches Q1-Q8, S1, Q11-Q12, QB1, BATFET1 and BATFET2) may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should be noted while FIG. 2 shows the switches Q1-Q8 and Q11-Q12 are implemented as single n-type transistors, a person skilled in the art would recognize there may be many variations, modifications and alternatives. For example, depending on different applications and design needs, at least some of the switches (e.g., Q11) may be implemented as p-type transistors. BATFET1 and BATFET2 may be implemented as two back-to-back connected transistors. Furthermore, each switch shown in FIG. 2 may be implemented as a plurality of switches connected in parallel. Moreover, a capacitor may be connected in parallel with one switch to achieve zero voltage switching (ZVS)/zero current switching (ZCS).

FIG. 2 further shows the switches Q1-Q8 are integrated in a first semiconductor chip 103. The switches Q11, Q12, QB1, BATFET1 and BATFET2 are integrated in a second semiconductor chip 105. It should be noted that the semiconductor chips shown in FIG. 2 are merely an example, which should not unduly limit the scope of the claims. One of ordinary skill in the art would recognize many variations, alternatives, and modifications. For example, depending on design needs and different applications, Q1-Q8, Q11, Q12, QB1, BATFET1 and BATFET2 may be integrated in a single semiconductor chip.

In operation, in a pre-charge state of the dual-battery system comprising the first battery and the second battery, the step-down converter is configured to charge the first battery and the second battery through the first battery switch BATFET1 and the second battery switch BATFET2, respectively. The first battery switch BATFET1 may be configured to operate in a first regulation state to control the voltage across the first battery and/or the current flowing through to the first battery. The second battery switch BATFET2 may be configured to operate in a second regulation state to control the voltage across the second battery and/or the current flowing through to the second battery.

In a constant current charging state of the dual-battery system, the charge pump converter is configured to charge the first battery directly. In the constant current charging state, at least one of the first battery switch BATFET1 and the second battery switch BATFET2 is configured to achieve charge balancing between the first battery and the second battery.

In the constant current charging state of the dual-battery system, the dual-battery charging apparatus is able to operate in four different system configurations. In a first system configuration of the constant current charging state, the first battery switch BATFET1 is configured to be fully turned on. The second battery switch BATFET2 is configured to operate in a regulation state to achieve a balanced charge current distribution between the first battery and the second battery.

In a second system configuration of the constant current charging state, the second battery switch BATFET2 is configured to be fully turned on. The first battery switch BATFET1 is configured to operate in a regulation state to achieve a balanced charge current distribution between the first battery and the second battery.

In a third system configuration of the constant current charging state, the first battery switch BATFET1 and the second battery switch BATFET2 are configured to operate in a first regulation state and a second regulation state respectively to achieve a balanced charge current distribution between the first battery and the second battery. Furthermore, a ratio of a voltage drop on the first battery switch BATFET1 to a voltage drop on the second battery switch BATFET2 is dynamically adjustable based on a temperature of the first battery switch BATFET1 and a temperature of the second battery switch BATFET2.

In a fourth system configuration of the constant current charging state, the first battery switch BATFET1 and the second battery switch BATFET2 are configured to operate in two different operating modes. In a first operating mode, the first battery switch BATFET1 is fully turned on, and the second battery switch BATFET2 is configured to operate in a second regulation state to achieve a balanced charge current distribution between the first battery and the second battery. In a second operating mode, the second battery switch BATFET2 is fully turned on, and the first battery switch BATFET1 is configured to operate in a first regulation state to achieve a balanced charge current distribution between the first battery and the second battery. In the constant current charging state of the dual-battery system, the first operating mode and the second operating mode are carried out in an alternating manner to achieve better performance of the dual-battery charging apparatus.

In a constant voltage charging state of the dual-battery system, the step-down converter is configured to charge the first battery and the second battery. At least one of the first battery switch BATFET1 and the second battery switch BATFET2 is configured to operate in a regulation state so as to achieve constant voltage charging of the first battery and the second battery.

In the constant voltage charging state of the dual-battery system, the dual-battery charging apparatus is able to operate in four different system configurations. In a first system configuration of the constant voltage charging state, the step-down converter is configured to provide a regulated voltage. The first battery switch BATFET1 is configured to operate in a first regulation state to achieve the constant voltage charging of the first battery. The second battery switch BATFET2 is configured to operate in a second regulation state to achieve the constant voltage charging of the second battery.

In a second system configuration of the constant voltage charging state, the step-down converter is configured to provide a regulated voltage applied to the first battery through fully turning on the first battery switch BATFET1. The second battery switch BATFET2 is configured to operate in a second regulation state to achieve the constant voltage charging of the second battery.

In a third system configuration of the constant voltage charging state, the step-down converter is configured to provide a regulated voltage applied to the second battery through fully turning on the second battery switch BATFET2. The first battery switch BATFET1 is configured to operate in a first regulation state to achieve the constant voltage charging of the first battery.

In a fourth system configuration of the constant voltage charging state, the first battery switch BATFET1 and the second battery switch BATFET2 are configured to operate in two different operating modes. In a first operating mode, the first battery switch BATFET1 is configured to operate in a first regulation state to achieve the constant voltage charging of the first battery. The second battery switch BATFET2 is configured to operate in a second regulation state to achieve the constant voltage charging of the second battery. In a second operating mode, one switch of the first battery switch BATFET1 and the second battery switch BATFET2 is configured to be fully turned on, and the other switch of the first battery switch BATFET1 and the second battery switch BATFET2 is configured to operate in a regulation state. In the constant voltage charging state of the battery system, the first operating mode and the second operating mode are carried out in an alternating manner to achieve better performance of the dual-battery charging apparatus.

In operation, when a power source is not available at the input voltage bus VIN, and the voltage of the second battery is higher than the voltage of the first battery, the second battery is configured to provide power for the system bus and charge the first battery.

In the constant current charging state of the dual-battery system, the first battery switch BATFET1 is turned off, and the second battery switch BATFET2 is turned on. In response to this configuration, the charge pump may be used charges the first battery. The buck converter charges the second battery.

It should be noted while FIG. 2 shows the dual-battery charging apparatus is employed to charge a dual-battery system, the battery charging apparatus can be used to charge a multiple-battery system. For example, in a triple-battery system, one more battery switch may be added to fulfill the functions described above with respect to FIG. 2.

Figure 3:
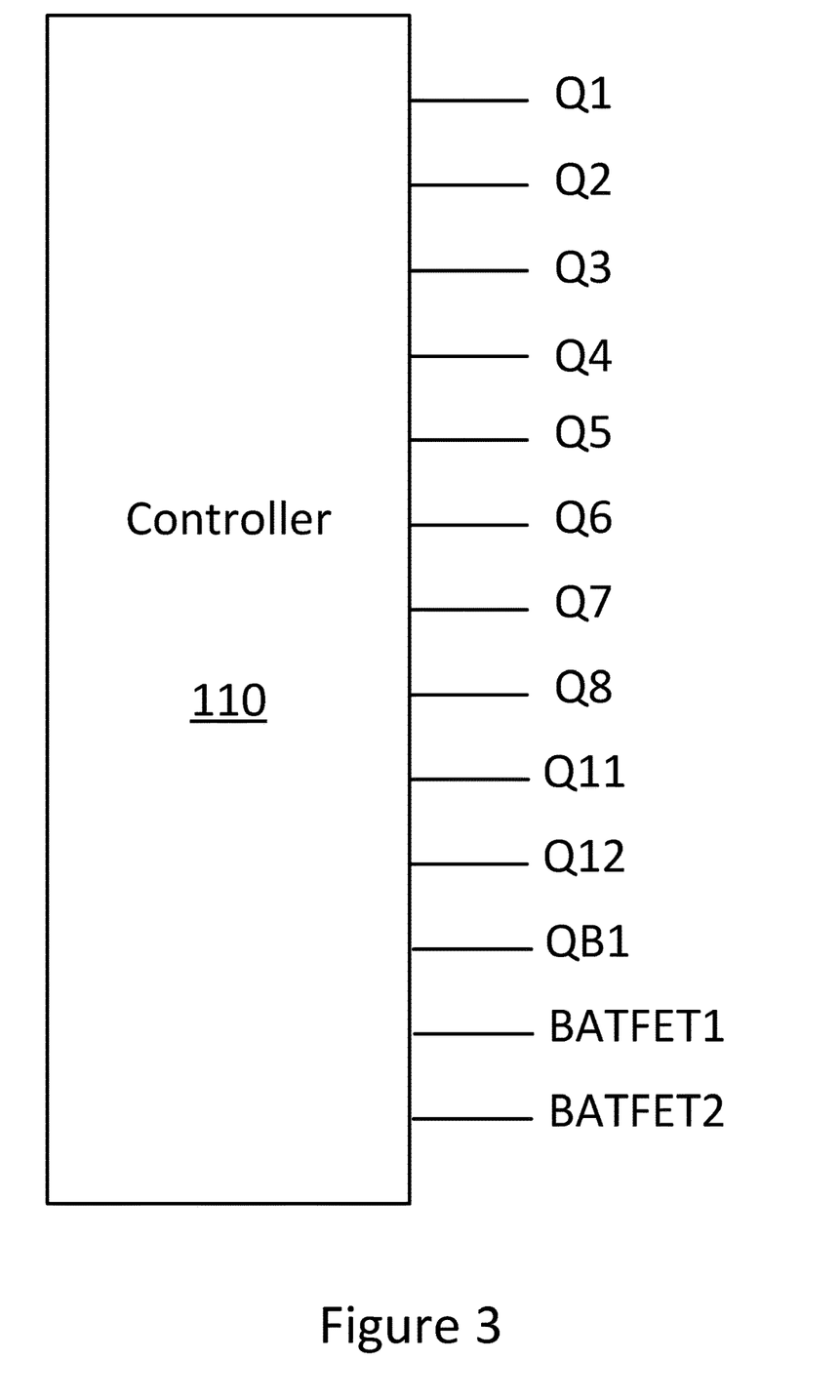
FIG. 3 illustrates a controller for driving the switches of the dual-battery charging apparatus shown in FIG. 1 in accordance with various embodiments of the present disclosure.

FIG. 3 illustrates a controller for driving the switches of the dual-battery charging apparatus shown in FIG. 1 in accordance with various embodiments of the present disclosure. The controller 110 comprises thirteen gate drivers and a plurality of signal processing devices for processing various operating parameters such as the voltages of the first battery and the second battery.

A first gate driver is configured to generate a first gate drive signal applied to the gate of Q1. A second gate driver is configured to generate a second gate drive signal applied to the gate of Q2. A third gate driver is configured to generate a third gate drive signal applied to the gate of Q3. A fourth gate driver is configured to generate a fourth gate drive signal applied to the gate of Q4. A fifth gate driver is configured to generate a fifth gate drive signal applied to the gate of Q5. A sixth gate driver is configured to generate a sixth gate drive signal applied to the gate of Q6. A seventh gate driver is configured to generate a seventh gate drive signal applied to the gate of Q7. An eighth gate driver is configured to generate an eighth gate drive signal applied to the gate of Q8. A ninth gate driver is configured to generate a ninth gate drive signal applied to the gate of Q11. A tenth gate driver is configured to generate a tenth gate drive signal applied to the gate of Q12. An eleventh gate driver is configured to generate an eleventh gate drive signal applied to the gate of QB1. A twelfth gate driver is configured to generate a twelfth gate drive signal applied to the gate of BATFET1. A thirteenth gate driver is configured to generate a thirteenth gate drive signal applied to the gate of BATFET2.

In operation, in a pre-charge state of a dual-battery system, the controller 110 configures the step-down converter shown in FIG. 2 to charge the first battery and the second battery through the first battery switch and the second battery switch, respectively. In a constant current charging state of the dual-battery system, the controller 110 configures the charge pump converter shown in FIG. 2 to charge the first battery directly. In the constant current charging state, at least one of the first battery switch and the second battery switch is configured to achieve charge balancing between the first battery and the second battery. In a constant voltage charging state of the dual-battery system, the controller 110 configures the step-down converter to charge the first battery and the second battery. At least one of the first battery switch and the second battery switch is configured to operate in a regulation state so as to achieve constant voltage charging of the first battery and the second battery.

Figure 4:
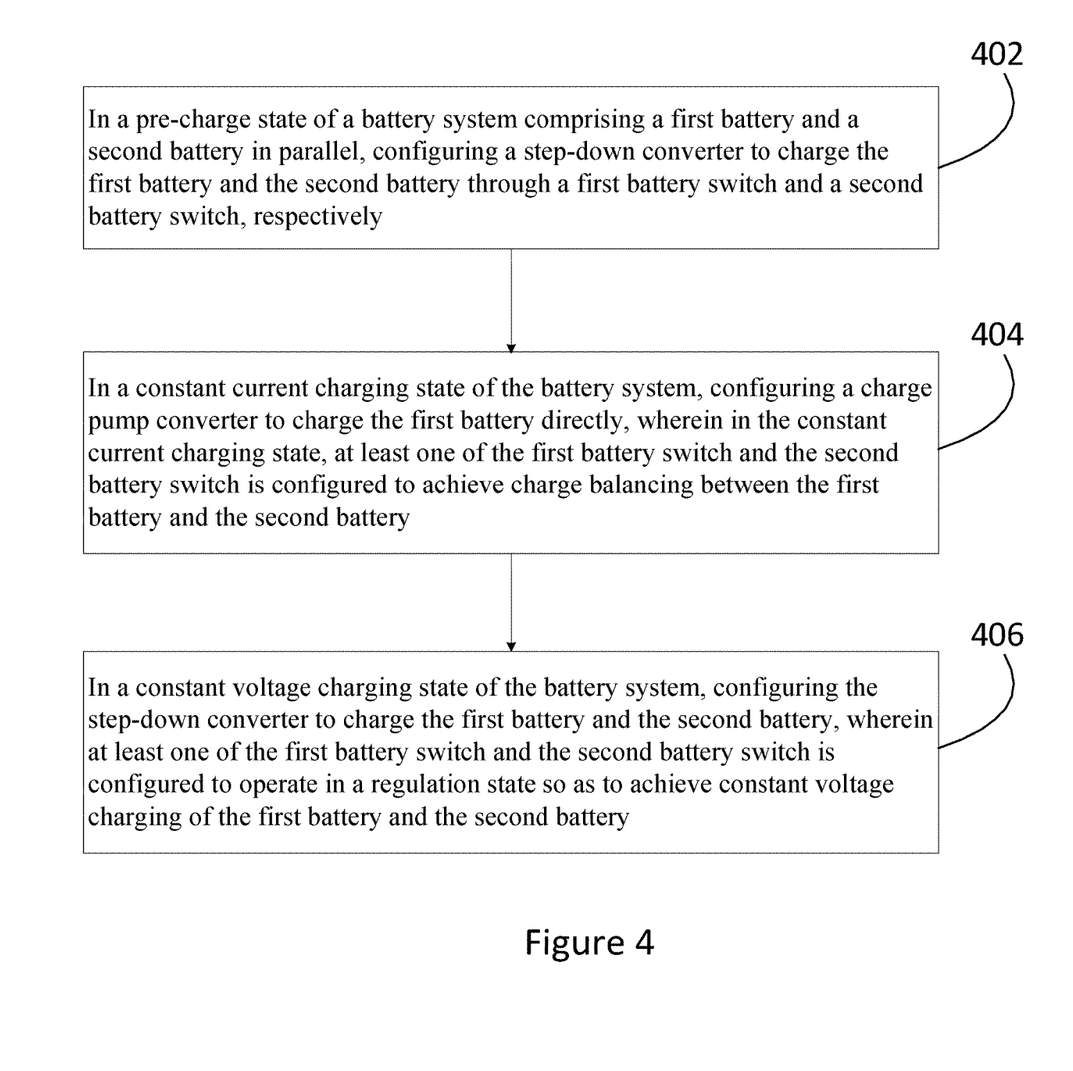
FIG. 4 illustrates a flow chart of controlling the dual-battery charging apparatus shown in FIG. 1 in accordance with various embodiments of the present disclosure.

It should be noted that the controller 110 having ten gate drivers described above is merely an example, which should not unduly limit the scope of the claims. One of ordinary skill in the art would recognize many variations, alternatives, and modifications. For example, external gate drivers may be used to further improve the drive capability FIG. 4 illustrates a flow chart of controlling the dual-battery charging apparatus shown in FIG. 1 in accordance with various embodiments of the present disclosure. This flowchart shown in FIG. 4 is merely an example, which should not unduly limit the scope of the claims. One of ordinary skill in the art would recognize many variations, alternatives, and modifications. For example, various steps illustrated in FIG. 4 may be added, removed, replaced, rearranged and repeated.

Referring back to FIG. 2, the charge pump converter is connected between the input voltage bus and the first battery. The step-down converter has an input coupled to the input voltage bus, and two outputs coupled to the first battery and the second battery through the first battery switch and the second battery switch, respectively. Referring back to FIG. 3, a controller comprises a plurality of gate drivers. The plurality of gate drivers is configured to generate a plurality of gate drive signals for driving the charge pump converter and the step-down converter.

At step 402, in a pre-charge state of a battery system comprising a first battery and a second battery in parallel, the step-down converter is configured to charge the first battery and the second battery through the first battery switch and the second battery switch, respectively.

At step 404, in a constant current charging state of the battery system, the charge pump converter is configured to charge the first battery directly. In the constant current charging state, at least one of the first battery switch and the second battery switch is configured to achieve charge balancing between the first battery and the second battery.

At step 406, in a constant voltage charging state of the battery system, the step-down converter is configured to charge the first battery and the second battery. At least one of the first battery switch and the second battery switch is configured to operate in a regulation state so as to achieve constant voltage charging of the first battery and the second battery.

The method further comprises in the constant voltage charging state of the battery system, configuring the step-down converter to provide a regulated voltage, configuring the first battery switch to operate in a first regulation state to achieve the constant voltage charging of the first battery, and configuring the second battery switch to operate in a second regulation state to achieve the constant voltage charging of the second battery.

The method further comprises in the constant voltage charging state of the battery system, configuring the step-down converter to provide a regulated voltage applied to the first battery through fully turning on the first battery switch, and configuring the second battery switch to operate in a second regulation state to achieve the constant voltage charging of the second battery.

The method further comprises in the constant voltage charging state of the battery system, configuring the step-down converter to provide a regulated voltage applied to the second battery through fully turning on the second battery switch, and configuring the first battery switch to operate in a first regulation state to achieve the constant voltage charging of the first battery.

The method further comprises in a first operating mode, configuring the first battery switch to operate in a first regulation state to achieve the constant voltage charging of the first battery, and configuring the second battery switch to operate in a second regulation state to achieve the constant voltage charging of the second battery, and in a second operating mode, configuring one switch of the first battery switch and the second battery switch to be fully turned on, and configuring the other switch of the first battery switch and the second battery switch to operate in a regulation state, wherein in the constant voltage charging state of the battery system, the first operating mode and the second operating mode are carried out in an alternating manner.

Referring back to FIG. 2, the charge pump converter is a dual-phase switched capacitor converter. The step-down converter is a buck converter.

The method further comprises in the constant current charging state of the battery system, configuring the first battery switch to be fully turned on, and configuring the second battery switch to operate in a regulation state to achieve a balanced charge current distribution between the first battery and the second battery.

The method further comprises in the constant current charging state of the battery system, configuring the second battery switch to be fully turned on, and configuring the first battery switch to operate in a regulation state to achieve a balanced charge current distribution between the first battery and the second battery.

The method further comprises in the constant current charging state of the battery system, configuring the first battery switch and the second battery switch to operate in a first regulation state and a second regulation state respectively to achieve a balanced charge current distribution between the first battery and the second battery, wherein a ratio of a voltage drop on the first battery switch to a voltage drop on the second battery switch is dynamically adjustable based on a temperature of the first battery switch and a temperature of the second battery switch.

The method further comprises in the constant current charging state of the battery system, in a first operating mode, fully turning on the first battery switch and configuring the second battery switch to operate in a second regulation state to achieve a balanced charge current distribution between the first battery and the second battery, and in a second operating mode, fully turning on the second battery switch and configuring the first battery switch to operate in a first regulation state to achieve the balanced charge current distribution between the first battery and the second battery, wherein in the constant current charging state of the battery system, the first operating mode and the second operating mode are carried out in an alternating manner.

Referring back to FIG. 2, the charge pump converter comprises a first switch, a second switch, a third switch and a fourth switch connected in series between the input voltage bus and ground, a first flying capacitor connected between a common node of the first switch and the second switch, and a common node of the third switch and the fourth switch, a fifth switch, a sixth switch, a seventh switch and an eighth switch connected in series between the input voltage bus and ground, and a second flying capacitor connected between a common node of the fifth switch and the sixth switch, and a common node of the seventh switch and the eighth switch, and wherein the common node of the second switch and the third switch is connected to a common node of the sixth switch and the seventh switch, and further connected to an output of the charge pump converter.

Referring back to FIG. 2, the step-down converter comprises a high-side switch and a low-side switch connected in series between the input voltage bus and ground, and an inductor connected between a common node of the high-side switch and the low-side switch, and an output bus of the step-down converter.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A battery charging apparatus comprising:
   a first converter having an input coupled to an input voltage bus and an output coupled to a first battery and coupled to a second battery through a first bidirectional current blocking switch and a second bidirectional current blocking switch; and
   a second converter having an input coupled to the input voltage bus and an output coupled to the first battery and the second battery through the first bidirectional current blocking switch and the second bidirectional current blocking switch, respectively, wherein:
   in a constant current charging state of the first battery and the second battery, the first converter is configured to charge the first battery directly;
   one switch of the first bidirectional current blocking switch and the second bidirectional current blocking switch is configured to be fully turned on, and the other switch of the first bidirectional current blocking switch and the second bidirectional current blocking switch is configured to operate in a regulation state, or the first bidirectional current blocking switch and the second bidirectional current blocking switch are both configured to operate in a regulation state, in order to achieve charge balancing between the first battery and the second battery; and
   the second converter is configured not to operate.

2. The battery charging apparatus of claim 1, further comprising:
   a controller configured to generate gate drive signals for configuring the first converter and the second converter during a charging process of the first battery and the second battery so as to achieve charge balancing between the first battery and the second battery.

3. The battery charging apparatus of claim 1, wherein: the first battery and the second battery are configured to be connected in parallel through turning on the first bidirectional current blocking switch and the second bidirectional current blocking switch.

4. The battery charging apparatus of claim 1, wherein: the first converter is a dual-phase switched capacitor converter; and
the second converter is a buck converter.

5. The battery charging apparatus of claim 4, wherein the dual-phase switched capacitor converter comprises:
a first switch, a second switch, a third switch and a fourth switch connected in series between the input voltage bus and ground;
a first flying capacitor connected between a common node of the first switch and the second switch, and a common node of the third switch and the fourth switch;
a fifth switch, a sixth switch, a seventh switch and an eighth switch connected in series between the input voltage bus and ground; and
a second flying capacitor connected between a common node of the fifth switch and the sixth switch, and a common node of the seventh switch and the eighth switch, and wherein the common node of the second switch and the third switch is connected to a common node of the sixth switch and the seventh switch, and further connected to an output of the dual-phase switched capacitor converter.

6. The battery charging apparatus of claim 4, wherein the buck converter comprises:
a high-side switch and a low-side switch connected in series between an input of the buck converter and ground; and
an inductor connected between a common node of the high-side switch and the low-side switch, and an output bus of the buck converter.

7. The battery charging apparatus of claim 6, further comprising:
a battery reverse blocking switch connected between the input of the buck converter and the input voltage bus.

8. The battery charging apparatus of claim 7, wherein: switches of the first converter, the battery reverse blocking switch, the first bidirectional current blocking switch and the second bidirectional current blocking switch are integrated in a same semiconductor chip.

9. A method comprising:
in a pre-charge state of a battery system comprising a first battery and a second battery in parallel, configuring a step-down converter to charge the first battery and the second battery through a first battery switch and a second battery switch, respectively;
in a constant current charging state of the battery system, configuring a charge pump converter to charge the first battery directly, wherein one switch of the first battery switch and the second battery switch is configured to be fully turned on, and the other switch of the first battery switch and the second battery switch is configured to operate in a regulation state, or the first battery switch and the second battery switch are both configured to operate in a regulation state, in order to achieve charge balancing between the first battery and the second battery, and configuring the step-down converter not to operate; and
in a constant voltage charging state of the battery system, configuring the step-down converter to charge the first battery and the second battery, wherein at least one of the first battery switch and the second battery switch is configured to operate in a regulation state so as to achieve constant voltage charging of the first battery and the second battery.

10. The method of claim 9, further comprising:
in the constant voltage charging state of the battery system, configuring the step-down converter to provide a regulated voltage;
configuring the first battery switch to operate in a first regulation state to achieve the constant voltage charging of the first battery; and
configuring the second battery switch to operate in a second regulation state to achieve the constant voltage charging of the second battery.

11. The method of claim 9, further comprising:
in the constant voltage charging state of the battery system, configuring the step-down converter to provide a regulated voltage applied to the first battery through fully turning on the first battery switch; and
configuring the second battery switch to operate in a second regulation state to achieve the constant voltage charging of the second battery.

12. The method of claim 9, further comprising:
in the constant voltage charging state of the battery system, configuring the step-down converter to provide a regulated voltage applied to the second battery through fully turning on the second battery switch; and
configuring the first battery switch to operate in a first regulation state to achieve the constant voltage charging of the first battery.

13. The method of claim 9, further comprising:
in a first operating mode, configuring the first battery switch to operate in a first regulation state to achieve the constant voltage charging of the first battery, and configuring the second battery switch to operate in a second regulation state to achieve the constant voltage charging of the second battery; and
in a second operating mode, configuring one switch of the first battery switch and the second battery switch to be fully turned on, and configuring the other switch of the first battery switch and the second battery switch to operate in a regulation state, wherein in the constant voltage charging state of the battery system, the first operating mode and the second operating mode are carried out in an alternating manner.

14. The method of claim 9, wherein:
the charge pump converter is a dual-phase switched capacitor converter; and
the step-down converter is a buck converter.

15. The method of claim 9, further comprising:
in the constant current charging state of the battery system, configuring the first battery switch to be fully turned on; and
configuring the second battery switch to operate in a regulation state to achieve a balanced charge current distribution between the first battery and the second battery.

16. The method of claim 9, further comprising:
in the constant current charging state of the battery system, configuring the second battery switch to be fully turned on; and
configuring the first battery switch to operate in a regulation state to achieve a balanced charge current distribution between the first battery and the second battery.

17. The method of claim 9, further comprising:
in the constant current charging state of the battery system, configuring the first battery switch and the second battery switch to operate in a first regulation state and a second regulation state respectively to achieve a balanced charge current distribution between the first battery and the second battery, wherein a ratio of a voltage drop on the first battery switch to a voltage drop on the second battery switch is dynamically adjustable based on a temperature of the first battery switch and a temperature of the second battery switch.

18. The method of claim 9, further comprising:
in the constant current charging state of the battery system, in a first operating mode, fully turning on the first battery switch and configuring the second battery switch to operate in a second regulation state to achieve a balanced charge current distribution between the first battery and the second battery; and
in a second operating mode, fully turning on the second battery switch and configuring the first battery switch to operate in a first regulation state to achieve the balanced charge current distribution between the first battery and the second battery, wherein in the constant current charging state of the battery system, the first operating mode and the second operating mode are carried out in an alternating manner.

19. A controller comprising:
a plurality of gate drivers configured to generate a plurality of gate drive signals for driving switches of a charge pump converter, switches of a step-down converter, a first battery switch and a second battery switch, wherein:
the charge pump converter has an input coupled to an input voltage bus and an output coupled to a first battery and coupled to a second battery through the first battery switch and the second battery switch; and
the step-down converter has an input coupled to the input voltage bus and an output coupled to the first battery and a second battery through the first battery switch and the second battery switch, respectively, wherein:
in a constant current charging state of the first battery and the second battery, the charge pump converter is configured to charge the first battery directly;
one switch of the first battery switch and the second battery switch is configured to be fully turned on, and the other switch of the first battery switch and the second battery switch is configured to operate in a regulation state, or the first battery switch and the second battery switch are both configured to operate in a regulation state, in order to achieve charge balancing between the first battery and the second battery; and
the step-down converter is configured not to operate.

20. The controller of claim 19, wherein the controller is configured such that:
in a pre-charge state of a battery system comprising the first battery and the second battery in parallel, configure the step-down converter to charge the first battery and the second battery through the first battery switch and the second battery switch, respectively;
in a constant current charging state of the battery system, configure the charge pump converter to charge the first battery directly, wherein in the constant current charging state, at least one of the first battery switch and the second battery switch is configured to achieve charge balancing between the first battery and the second battery; and
in a constant voltage charging state of the battery system, configure a step-down converter to charge the first battery and the second battery, wherein at least one of the first battery switch and the second battery switch is configured to operate in a regulation state so as to achieve constant voltage charging of the first battery and the second battery.

* * * * *